United States Patent [19]
Becker

[11] Patent Number: 6,070,611
[45] Date of Patent: *Jun. 6, 2000

[54] SANITARY FITTING WITH A CARTRIDGE

[75] Inventor: Albert Becker, Wittlich-Luxem, Germany

[73] Assignee: American Standard Inc., Piscataway, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,679

[22] Filed: Jun. 11, 1997

[30] Foreign Application Priority Data

Jun. 18, 1996 [AT] Austria ..................................... 1075/96

[51] Int. Cl.$^7$ ................................................. F16K 11/074
[52] U.S. Cl. .................................... 137/625.4; 137/625.17
[58] Field of Search ............................ 137/625.4, 625.41, 137/625.17

[56] References Cited

U.S. PATENT DOCUMENTS

| | | | |
|---|---|---|---|
| 3,512,547 | 5/1970 | Gibbs et al. .................... | 137/625.17 X |
| 3,625,255 | 12/1971 | Genin .................................... | 137/625.4 |
| 4,226,260 | 10/1980 | Schmitt ........................... | 137/625.17 X |
| 4,676,270 | 6/1987 | Knapp et al. ......................... | 137/625.4 |
| 4,708,172 | 11/1987 | Riis ....................................... | 137/625.4 |
| 4,796,666 | 1/1989 | Bergmann ....................... | 137/625.17 X |
| 5,303,737 | 4/1994 | Koch .................................. | 137/625.17 |
| 5,329,958 | 7/1994 | Bosio .............................. | 137/625.17 X |
| 5,331,997 | 7/1994 | Bosio .............................. | 137/625.17 X |
| 5,402,827 | 4/1995 | Gonzalez ........................... | 137/625.17 |
| 5,404,911 | 4/1995 | Tres Casas ........................... | 137/625.4 |

FOREIGN PATENT DOCUMENTS

| | | | |
|---|---|---|---|
| 0018438 | 11/1980 | Germany ............................. | 137/625.4 |
| 1179942 | 2/1970 | United Kingdom ............... | 137/625.4 |

*Primary Examiner*—John Rivell
*Assistant Examiner*—Meredith H. Schoenfeld
*Attorney, Agent, or Firm*—Joseph M. Homa

[57] ABSTRACT

A sanitary fitting with a cartridge, a mixer and a spout which is built integrally with a housing and can be swivelled around the mixer, whereby the housing glides on at least one sliding ring located in a groove provided in the mixer. The external dimensions of the fitting are kept as small as possible. The diameter of the mixer is smaller than the diameter of the cartridge and a spacer, preferably made of plastic, is placed between the cartridge and the mixer, whereby the spacer has on the side facing the cartridge at least the diameter of the cartridge. Alternatively or in addition, a washer can be inserted into the groove for the sliding ring to seal the mixer from the housing.

24 Claims, 2 Drawing Sheets

SANITARY FITTING WITH A CARTRIDGE

The present invention is directed to a sanitary fitting having a cartridge, mixer and a spout built integrally with a housing. The spout and housing can be swivelled around the mixer, whereby the housing slides on at least one sliding ring located in a groove provided in the mixer. The fitting may be used where more than one sink must be reached by one fitting as, for example, in a kitchen.

In existing sanitary fittings, both the cartridge and the mixer of the sanitary fitting must have the same diameter in order to be properly positioned in relation to each other. In order to attain an exact distancing between the base of the cartridge and the opposing surface of the mixer, existing cartridge housings typically have projections on their lower ends which rest on the top surface of the mixer. Located around the mixer is a housing which swivels or pivots horizontally and houses a swivelling spout whereby the housing further increases the circumference of this part of the sanitary fitting. To make the fitting look attractive, the cover surrounding the cartridge is usually produced with the same external diameter as the swivelling spout so that both cylindrical elements are in alignment. The overall appearance of the fitting is quite bulky and awkward. The mixer also has grooves in which sliding rings are inserted and on which the swivelling spout housing turns. These grooves are provided in addition to the grooves which contain O-rings to seal the mixer from the swivelling spout housing. To provide space for all grooves, the fitting must have a particular minimum height. Therefore, fittings with swivelling spouts have a larger diameter and are higher than fittings with a fixed spout.

SUMMARY OF THE INVENTION

It is therefore an object of the invention to provide a sanitary fitting with a swivelling spout which has smaller external dimensions than spouts of existing fittings.

This and other objects are achieved by the present invention which provides a mixer having a diameter smaller than the diameter of the cartridge, and a spacer, preferably made of plastic, located between the cartridge and the mixer. The diameter on the side of the spacer facing the cartridge is at least as large as the diameter of the cartridge. The lengthening pieces on the cartridge housing can be supported by the spacer and the mixer can be of smaller dimensions so that the external diameter of the swivelling spout housing is only slightly larger than the cartridge and is in alignment with a thin covering cap surrounding the cartridge. Thus, the spacer overhangs the mixer to create a circumferential recess under the spacer and around the mixer, and at least part of the base of the swiveling spout is disposed within the circumferential recess under the spacer and around the mixer. When the mixer is smaller, the sanitary fitting looks more graceful. Also, its smaller size saves material which is particularly important because the mixer is made of metal.

Also advantageous in terms of saving material and improving the outer appearance, the sanitary fitting includes a washer to seat the mixer from the housing set in the groove for the sliding ring. As these grooves are used by both the sliding rings and the washers, the minimum height of the mixer can be reduced considerably. Accordingly, the overall height of the sanitary fitting is reduced which results in a more graceful appearance and saves material on an otherwise very costly metal component in the sanitary fitting.

In one embodiment of the sanitary fitting, ridges which are preferably elastically deformable are placed along the circumference of the spacer, whereby the lower part of the cartridge can be slipped between these ridges and a covering cap placed on top of them. This facilitates an easy assembly of the sanitary fitting, an exact positioning of the cartridge in relation to the spacer, and a secure fit for the covering cap. The ridges can preferably be connected by thin walls arranged along the circumference of the spacer, which prevent the covering cap from slipping between the cartridge and ridges by mistake as it is being put on.

In accordance with a preferred embodiment of the sanitary fitting, there is in addition to the spacer, a common groove for the sliding ring and a washer which seals the mixer from the housing. In this way the outer dimensions of the sanitary fitting are kept as small as possible and the size of the mixer is minimized, which saves material.

BRIEF DESCRIPTION OF THE DRAWINGS

This invention will be more fully appreciated from the following detailed description when the same is considered in connection with the accompanying drawings in which.

DETAILED DESCRIPTION OF THE INVENTION

Figure 1:
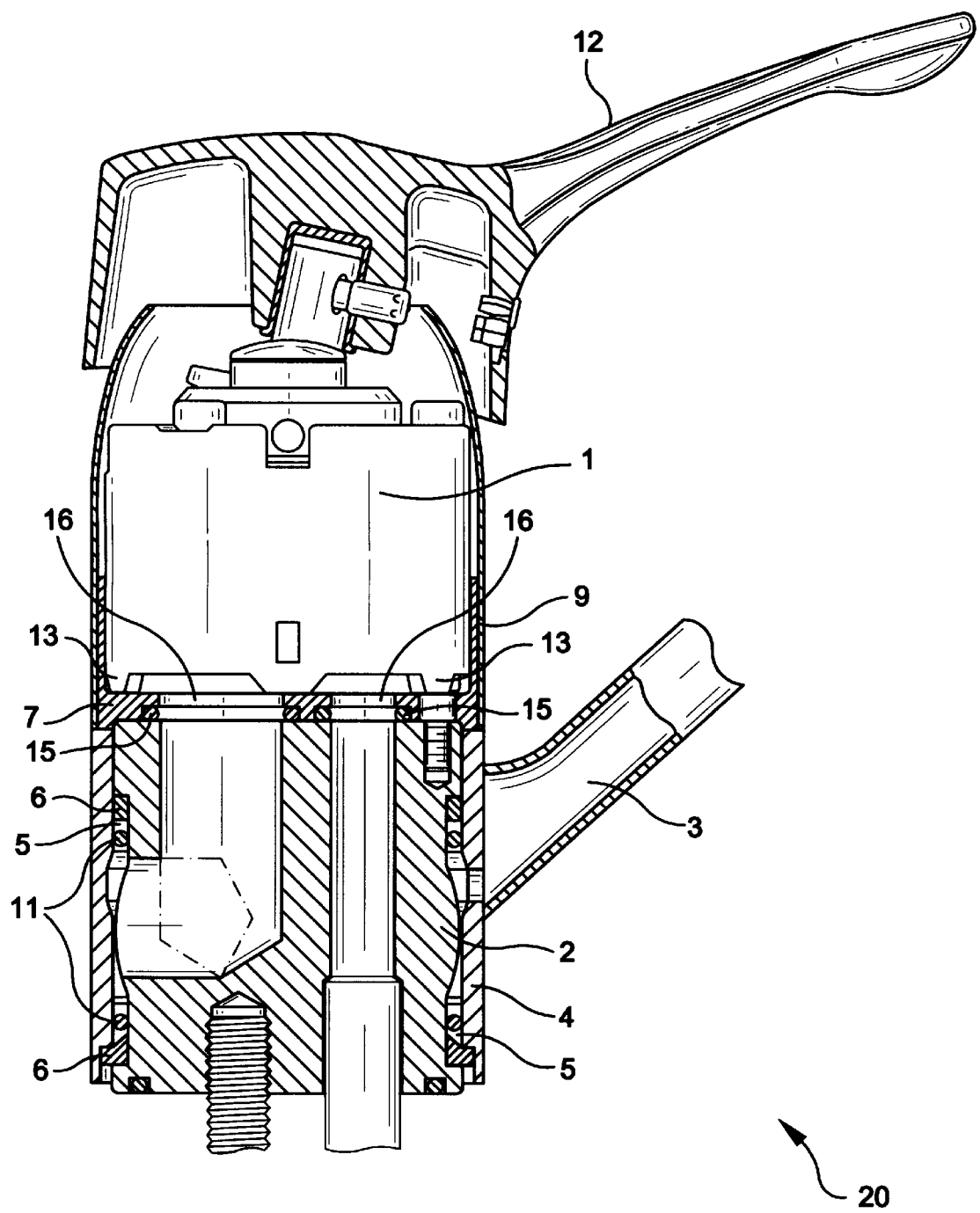
FIG. 1 is a sectional view of a single-lever mixer with a swivelling spout in accordance with the invention.

FIG. 1 shows a fitting 20 which contains a cartridge 1. Fitting 20 which can be operated by a lever 12 includes a lower section encircled by a spacer 7 also shown in FIG. 2. At the lower end of cartridge 1 are projections 13 which are supported at the external circumference of a base 14 of spacer 7. Mixer 2 is joined to the surface of base 14 of spacer 7 which has one side facing mixer 2 and one side facing cartridge 1. The side of spacer 7 facing mixer 2 has a smaller diameter than cartridge 1. In mixer 2, grooves 5 are provided which each hold a sliding ring 6 and a washer 11. Mixer seals 15, such as washers or o-rings, are disposed between the top surface of the mixer 2 and the surface of the base 14 which faces the mixer 2 proximate to the openings 16 in the spacer 7. A housing 4, built integrally with a spout 3, can be swivelled on the sliding rings 6 around mixer 2.

Figure 2:
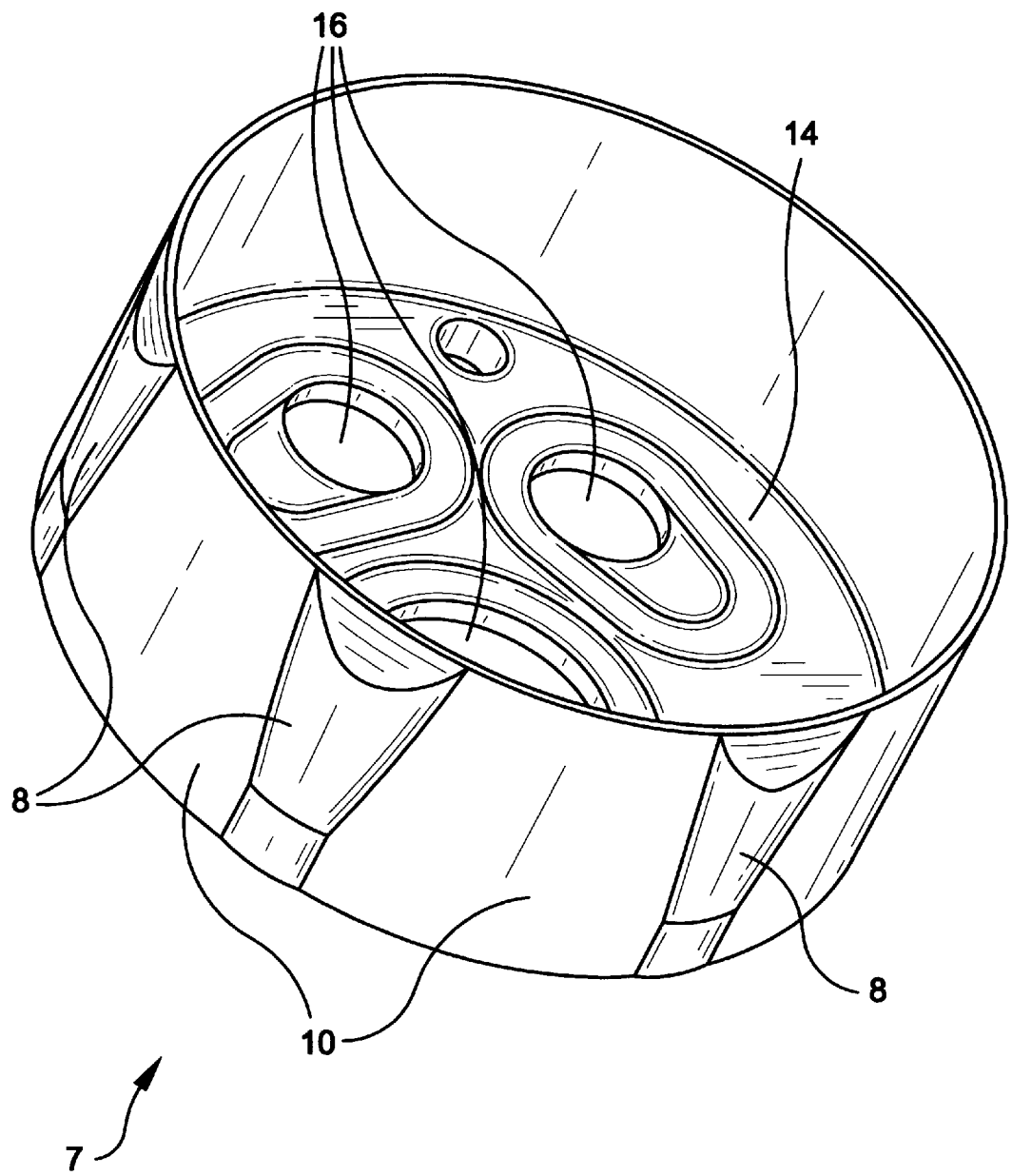
FIG. 2 is a perspective view of a spacer taken from the mixer shown in FIG. 1.

As can be seen in FIG. 2, in spacer 7, base 14 has holes to allow cold water, hot water and mixed water to flow therethrough. In spacer 7, ridges 8 are disposed along the circumference of spacer 7 which support a cap 9 covering cartridge 1. To prevent covering cap 9 from slipping during assembly between the ridges 8 and the cartridge 1, there are thin walls 10 between ridges 8.

As can be seen in FIG. 1, the external diameter of covering cap 9 is only slightly larger than the diameter of cartridge 1. The external diameter of housing 4, which can be swivelled around mixer 2, is in alignment with the exterior of covering cap 9. The arrangement of a sliding ring 6 and a washer 11 in each case in a common groove 5 keeps the height of the mixer 2 low. The fitting shown here is about the same size as a fitting without a swivelling spout.

Although illustrative embodiments of the present invention have been described herein with reference to the accompanying drawings, it is to be understood that the invention is not limited to those precise embodiments, and that various other changes and modifications may be effected herein by one skilled in the art without departing from the scope or spirit of the invention.

What is claimed is:

1. A sanitary fitting comprising:

a mixer having a first diameter and at least one mixer opening for allowing water to flow therethrough;

at least one mixer seal for sealing around said at least one mixer opening;

a cartridge coupled to said mixer and having a second diameter which is larger than said first diameter; and a spacer disposed between said mixer and said cartridge, said spacer including a base which has a cartridge surface which faces and supports said cartridge and which has a mixer surface which faces said mixer, said base having a third diameter which is at least as large as said second diameter of said cartridge, wherein said base spaces said cartridge away from said mixer, and wherein said at least one mixer seal is disposed between said base and said mixer for sealing around said at least one mixer opening, whereby said third diameter of said spacer is larger than said first diameter of said mixer, whereby said spacer overhangs said mixer to create a circumferential recess under said spacer and around said mixer.

2. The sanitary fitting according to claim 1 wherein said spacer is made of plastic.

3. The sanitary fitting according to claim 1 further comprising a swivel spout having a base housing and a spout arm integral with said housing, wherein said base housing is pivotably mounted around said mixer, whereby at least part of said base housing is disposed within the circumferential recess under said spacer and around said mixer.

4. The sanitary fitting according to claim 3 further comprising washers and sliding rings disposed in grooves on said mixer for sealing said mixer from said housing.

5. The sanitary fitting according to claim 4 wherein said housing glides on at least one sliding ring in said mixer.

6. The sanitary fitting according to claim 1 further comprising a cartridge covering cap disposed around said cartridge.

7. The sanitary fitting according to claim 6 wherein said cartridge covering cap and said base housing have substantially the same outer diameter.

8. The sanitary fitting according to claim 1 wherein said spacer further comprises a plurality of ridges disposed around the periphery of said base, said ridges being adapted to surround said cartridge.

9. The sanitary fitting according to claim 8 further comprising a cartridge covering cap disposed over said ridges.

10. The sanitary fitting according to claim 9 wherein said spacer further comprises peripheral walls connecting said ridges.

11. A sanitary fitting comprising:

a cylindrical mixer having at least one mixer opening for allowing water to flow therethrough;

at least one mixer seal for sealing around said at least one mixer opening;

a cylindrical cartridge coupled to said mixer, wherein the diameter of said cartridge is larger than the diameter of said mixer; and a spacer having a disk-shaped base disposed between said mixer and said cartridge and spacing said cartridge from said mixer, wherein said at least one mixer seal is disposed between said base and said mixer for sealing around said at least one mixer opening, and wherein the diameter of said base is at least as large as the diameter of said cartridge, whereby the diameter of said base is larger than the diameter of said mixer;

whereby said base overhangs said mixer to create a circumferential recess under said base and around said mixer.

12. The sanitary fitting according to claim 11 wherein said spacer is made of plastic.

13. The sanitary fitting according to claim 11 further comprising a swivel spout having a base housing and a spout arm integral with said housing, wherein said base housing is pivotably mounted around said mixer, whereby at least part of said base housing is disposed within the circumferential recess under said spacer and around said mixer.

14. The sanitary fitting according to claim 13 further comprising washers and sliding rings disposed in grooves on said mixer for sealing said mixer from said housing.

15. The sanitary fitting according to claim 14 wherein said housing glides on at least one sliding ring in said mixer.

16. The sanitary fitting according to claim 11 further comprising a cartridge covering cap disposed around said cartridge.

17. The sanitary fitting according to claim 16 wherein said cartridge covering cap and said base housing have substantially the same outer diameter.

18. The sanitary fitting according to claim 11 wherein said spacer further comprises a plurality of ridges disposed around the periphery of said disk-shaped base, said ridges being adapted to surround said cartridge.

19. The sanitary fitting according to claim 18 further comprising a cartridge covering cap disposed over said ridges.

20. The sanitary fitting according to claim 19 wherein said spacer further comprises walls disposed around the periphery of said disk-shaped base, wherein said walls connect said ridges.

21. A spacer for use in a sanitary fitting which includes a mixer having at least one mixer opening, at least one mixer seal for placement between said spacer and said mixer and for sealing around said at least one mixer opening, and a cartridge coupled to the mixer, the cartridge having a larger diameter than the mixer, said spacer comprising:

a disk-shaped base capable of being disposed between the mixer and the cartridge, wherein the diameter of said base is at least as large as the diameter of the cartridge, whereby the diameter of said base is larger than the diameter of the mixer;

wherein said base is capable of supporting the cartridge and of spacing the cartridge from the mixer;

whereby said base is capable of overhanging the mixer to create a circumferential recess under said base and around said mixer.

22. The spacer according to claim 21 wherein said spacer is made from plastic.

23. The spacer according to claim 21 wherein said spacer further comprises a plurality of ridges disposed around the periphery of said disk-shaped base, wherein said ridges are adapted to surround the cartridge.

24. The spacer according to claim 23 wherein said spacer further comprises walls disposed around the periphery of said disk-shaped base, wherein said walls connect said ridges.

* * * * *